United States Patent
Choi et al.

(10) Patent No.: US 11,290,947 B2
(45) Date of Patent: Mar. 29, 2022

(54) DEVICE AND METHOD FOR ANALYZING SERVICE AVAILABILITY IN WIRELESS COMMUNICATION SYSTEM

(71) Applicant: Samsung Electronics Co., Ltd., Suwon-si (KR)

(72) Inventors: Sunyoung Choi, Seoul (KR); Sungbum Park, Seoul (KR); Minsung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/647,409

(22) PCT Filed: Sep. 6, 2018

(86) PCT No.: PCT/KR2018/010394
§ 371 (c)(1),
(2) Date: Mar. 13, 2020

(87) PCT Pub. No.: WO2019/054695
PCT Pub. Date: Mar. 21, 2019

(65) Prior Publication Data
US 2020/0260367 A1    Aug. 13, 2020

(30) Foreign Application Priority Data

Sep. 13, 2017 (KR) .................. 10-2017-0117157

(51) Int. Cl.
*H04W 48/16* (2009.01)
*H04W 4/029* (2018.01)
(Continued)

(52) U.S. Cl.
CPC .......... *H04W 48/16* (2013.01); *H04W 4/029* (2018.02); *H04W 16/18* (2013.01); *H04W 16/22* (2013.01); *H04W 48/20* (2013.01); *H04W 24/06* (2013.01)

(58) Field of Classification Search
CPC ....... H04W 4/021; H04W 24/02; H04W 4/02; H04W 16/00; H04W 4/50; H04W 16/18;
(Continued)

(56) References Cited

U.S. PATENT DOCUMENTS 8,355,364 B1 *  1/2013  Vargantwar ........... H04W 48/04
                                                        370/328
2002/0009992 A1  1/2002  Jensen
(Continued)

FOREIGN PATENT DOCUMENTS

JP    2004-201269 A    7/2004
JP    4174194 B2       10/2008
(Continued)

OTHER PUBLICATIONS

ISA/KR, International Search Report and Written Opinion of the International Searching Authority, International Application No. PCT/KR2018/010394, dated Dec. 20, 2018, 11 pages.
(Continued)

*Primary Examiner* — Nam T Huynh (57) ABSTRACT

Disclosed is a $5^{th}$ generation (5G) or pre-5G communication system for supporting a data transmission rate higher than that of a $4^{th}$ generation (4G) communication system such as long term evolution (LTE). The purpose of the disclosure is to analyze service availability, and an operating method of a server can include the steps of: receiving position information of a subscriber; determining service availability on the location indicated by the position information; and
(Continued)

transmitting recommendation information related to the communication of a device of the subscriber at the location.

15 Claims, 9 Drawing Sheets

(51) Int. Cl.
| | |
|---|---|
| *H04W 48/20* | (2009.01) |
| *H04W 16/18* | (2009.01) |
| *H04W 16/22* | (2009.01) |
| *H04W 24/06* | (2009.01) |

(58) Field of Classification Search
CPC ... H04W 16/20; H04W 16/22; H04W 16/225; H04W 24/08; H04W 64/003; H04L 41/16; H04B 17/318; H04B 17/27
See application file for complete search history.

(56) References Cited

U.S. PATENT DOCUMENTS

| | | | |
|---|---|---|---|
| 2004/0127224 A1 | 7/2004 | Furukawa et al. | |
| 2012/0040664 A1* | 2/2012 | Kamdar | H04W 24/02 455/425 |
| 2014/0155099 A1 | 6/2014 | Cho | |
| 2015/0036532 A1* | 2/2015 | Osterloh | H04L 43/50 370/252 |
| 2016/0285676 A1* | 9/2016 | Kerpez | H04M 3/304 |
| 2018/0084434 A1* | 3/2018 | Vuonnala | H04W 16/28 |
| 2019/0005166 A1* | 1/2019 | Yamauchi | G06F 30/20 |

FOREIGN PATENT DOCUMENTS

| | | |
|---|---|---|
| KR | 10-0641330 B1 | 10/2006 |
| KR | 10-0650566 B1 | 11/2006 |
| KR | 10-2014-0069793 A | 6/2014 |
| WO | 2016164042 A1 | 10/2016 |

OTHER PUBLICATIONS

Notice of Preliminary Rejection in connection with Korean Application No. 10-2017-0117157 dated Jun. 2, 2021, 18 pages.

* cited by examiner

DEVICE AND METHOD FOR ANALYZING SERVICE AVAILABILITY IN WIRELESS COMMUNICATION SYSTEM

CROSS-REFERENCE TO RELATED APPLICATIONS

This application is a 371 National Stage of International Application No. PCT/KR2018/010394, filed Sep. 6, 2018, which claims priority to Korean Patent Application No. 10-2017-0117157, filed Sep. 13, 2017, the disclosures of which are herein incorporated by reference in their entirety.

BACKGROUND

1. Field

The disclosure relates generally to a wireless communication system and, more particularly, to a device and a method for analyzing service availability in a wireless communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

5G systems are expected to use a slightly higher frequency band than existing cellular systems (e.g., LTE). In this case, the cell coverage of the 5G system will be smaller and signal attenuation will be greater than that of existing cellular systems. Thus, a problem regarding service availability depending on the location of the user may occur.

SUMMARY

Based on the discussion as described above, the disclosure provides a device and a method for effectively analyzing service availability in a wireless communication system.

The disclosure also provides a device and a method for analyzing service availability using beam based simulation in a wireless communication system.

The disclosure also provides a device and a method for analyzing service availability according to a user's location in a wireless communication system.

The disclosure also provides a device and a method for providing recommendation information for optimizing communication quality in accordance with a user's environment in a wireless communication system.

The disclosure also provides a device and a method for determining a site for installing a new base station for providing a service in a wireless communication system.

The disclosure also provides a device and a method for notifying the quality level of the service that can be provided in a wireless communication system.

In accordance with various embodiments of the disclosure, an operation method of a server in a wireless communication system may include: receiving position information of a subscriber; determining service availability for a location indicated by the position information; and transmitting recommendation information related to communication of the subscriber's device at the location.

In accordance with various embodiments of the disclosure, an operation method of a terminal in a wireless communication system may include: transmitting position information of a subscriber; receiving recommendation information related to communication of the subscriber's device at the location indicated by the position information; and displaying the recommendation information.

In accordance with various embodiments of the disclosure, a server device in a wireless communication system may include a transceiver, and at least one processor connected to the transceiver, wherein the processor may control to: receive position information of a subscriber; determine service availability for a location indicated by the position information; and transmit recommendation information related to communication of the subscriber's device at the location.

In accordance with various embodiments of the disclosure, a terminal device in a wireless communication system may include a transceiver, a display, and at least one processor connected to the transceiver and the display, wherein the at least one processor may control to: transmit position information of a subscriber; receive recommendation information related to communication of the subscriber's device at the location indicated by the position information; and display the recommendation information.

A device and a method according to various embodiments of the disclosure enable determining service availability by inspecting a frequency environment on a beam basis and providing recommendation information for optimizing communication quality.

Effects obtainable from the disclosure may not be limited to the above mentioned effects, and other effects which are not mentioned may be clearly understood, through the following descriptions, by those skilled in the art to which the disclosure pertains.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to a device and a method for analyzing service availability in a wireless communication system. Specifically, the disclosure describes a technique for performing a simulation for a frequency environment in a wireless communication system and providing a recommendation for optimizing communication quality according to the simulation result.

In the following description, terms referring to signals, terms referring to service-related statuses (e.g., availability), terms referring to control information, terms referring to network entities (e.g., base station), terms referring to device elements, and the like are illustratively used for the sake of convenience. Therefore, the disclosure is not limited by the terms as used below, and other terms referring to subjects having equivalent technical meanings may be used.

In the following description, various embodiments of the disclosure will be described using terms defined in 3rd generation partnership project long term evolution (3GPP LTE) standards for the convenience of description. However, various embodiments of the disclosure may be easily modified and applied to other communication systems.

Figure 1:
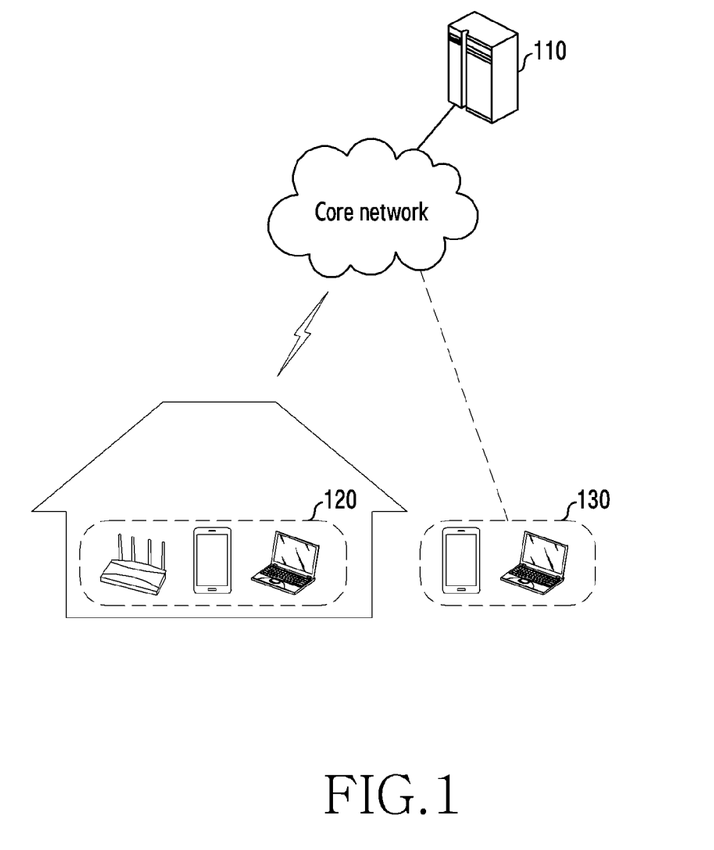
FIG. 1 illustrates a wireless communication system according to various embodiments of the disclosure.

FIG. 1 illustrates a wireless communication system according to various embodiments of the disclosure. FIG. 1 exemplifies a server 110 and terminals 120 and 130 as some of nodes capable of connecting to a wireless communication system.

The server 110 analyzes service availability. The server 110 may be operated by a service provider or a system operator. The server 110 may be configured by installing a program for analyzing service availability in a general-purpose server, or may be a device exclusively designed for service availability.

The terminal 120, which is a device used by a user, communicates with a node (e.g., a base station) in a core network via a wireless channel. That is, the terminal 120 is a device used by the subscriber of the wireless communication system. In some cases, the terminal 120 may operate without user involvement. That is, the terminal 120 is a device for performing machine type communication (MTC) and may not be carried by a user. For example, the terminal 120 may have a form of a fixed device (e.g., a consumer premises equipment (CPE), a personal computer (PC)), a smartphone, a laptop, or the like. The terminal 120 may be referred to as a term "user equipment (UE)", "mobile station", "subscriber station", "remote terminal", "wireless terminal", "user device", or other term having an equivalent technical meaning other than a terminal.

The terminal 130 accesses the server 110 and provides information for analyzing service availability. At this time, the determination target of the service availability is the terminal 120. That is, the terminal 130 may provide information about the terminal 120 to the server 110 and receive recommendation information for optimizing communication quality from the server 110. In some cases, the terminal 130 may be used by a user of the terminal 120, that is a subscriber, or by a person (e.g., an installation engineer) associated with a service provider. In some cases, the terminal 120 and the terminal 130 may be the same device. That is, when the terminal 120 is installed or scheduled to be installed, the user of the terminal 130 may request service availability analysis by providing information about the terminal 120 (e.g., position information) to the server 110. To this end, the terminal 130 has the capability to communicate with the server 110. In this case, communication with the server 110 may be performed via a core network or may be performed via a separate network.

Figure 2:
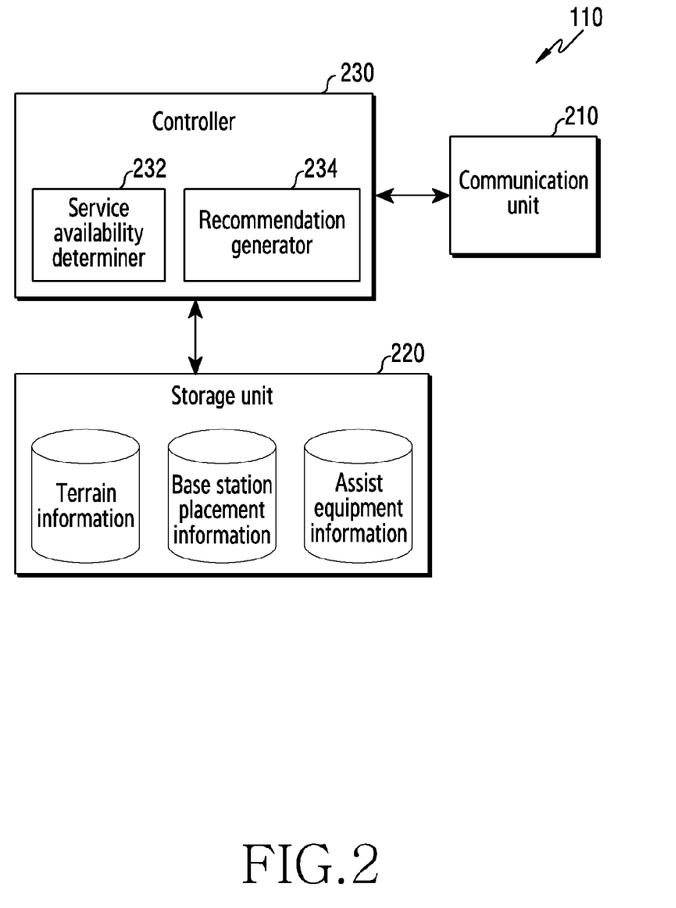
FIG. 2 illustrates a configuration of a server in a wireless communication system according to various embodiments of the disclosure.

FIG. 2 illustrates a configuration of a server in a wireless communication system according to various embodiments of the disclosure. The configuration exemplified in FIG. 2 may be understood as a configuration of a server 110. Hereinafter, the used terms " . . . part", " . . . unit", etc. refer to a unit for processing at least one function or operation, which may be implemented by hardware or software, or a combination of hardware and software.

Referring to FIG. 2, the server is configured to include a communication unit 210, a storage unit 220, and a controller 230.

The communication unit 210 provides an interface for communicating with other nodes in a network. That is, the communication unit 210 converts a bit stream transmitted from the server to another node, for example, a base station, a core network, an authentication server, etc. into a physical signal, and coverts a physical signal received from another node into a bit stream. That is, the communication unit 210 may transmit and receive a signal. Accordingly, the communication unit 210 may be referred to as a modem, a transmitter, a receiver, or a transceiver.

The storage unit 220 stores data such as basic program, application program, configuration information, etc. for operations of the server. Particularly, the storage unit 220 may store terrain information, base station placement information, and the like, as information necessary for performing a simulation on the subscriber's device (e.g., the terminal 120). In addition, the storage unit 220 may store assist equipment information for improving communication quality in order to generate recommendation information to be provided to the subscriber. The storage unit 220 provides the stored data according to the request of the controller 230.

The controller 230 controls overall operations of the server. For example, the controller 230 transmits and receives a signal through the communication unit 210. In addition, the controller 230 records data in the storage unit 220 and reads out. To this end, the controller 230 may include at least one processor. According to various embodiments, the controller 230 may include a service availability determiner 232 for determining service availability for the subscriber and a recommendation generator 234 for generating recommendation information for the subscriber's device. The service availability determiner 232 may perform a simulation on the subscriber's device and determine service availability, based on the simulation result. Here, the simulation may be performed on a wireless channel between a device of a specific base station and a specific subscriber, and may be performed on a beam in a specific direction. At this time, the base station may be defined based on a location where an antenna is installed, and in some cases, may be referred to as a distributed unit (DU), an analog unit (AU), or the like. The service availability determiner 232 and the recommendation generator 234, which are command sets or codes stored in the storage unit 220, may be at least a part of a command/code at least temporarily resided in the controller 230, a storage space storing a command/code, or a circuitry configuring the controller 230.

According to various embodiments, the controller 230 may control to receive the subscriber's position information, determine service availability for the location indicated by the position information, and transmit recommendation information related to communication of the subscriber's device at the location. In addition, if the service for the location is not available, the controller 230 may determine a candidate location for the additional installation of the base station to provide the service for the location. Furthermore, the controller 230 may control to determine and transmit a quality level of a service provided to the subscriber's device. For example, the controller 230 may control the server to perform operations according to various embodiments of the disclosure described below.

Figure 3:
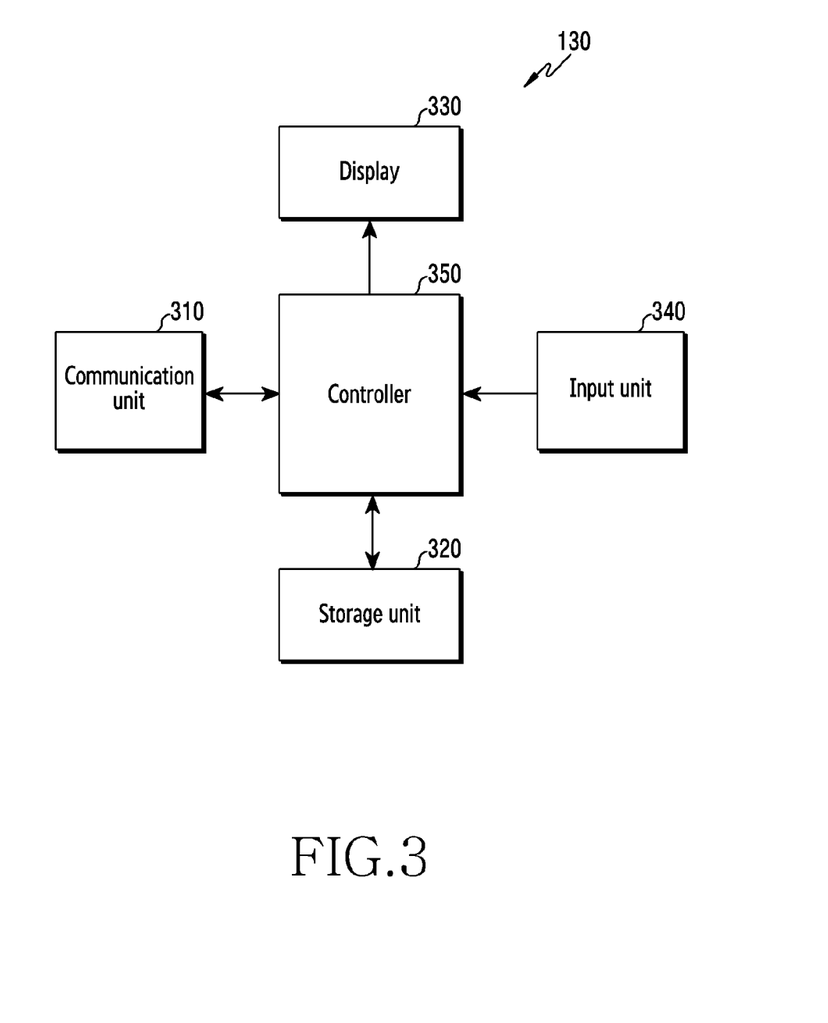
FIG. 3 illustrates a structure of a terminal in a wireless communication system according to various embodiments of the disclosure.

FIG. 3 illustrates a structure of a terminal in a wireless communication system according to various embodiments of the disclosure. The configuration exemplified in FIG. 3 may be understood as a configuration of a terminal 130. Hereinafter, the used terms " . . . part", " . . . unit", etc. refer to a unit for processing at least one function or operation, which may be implemented by hardware or software, or a combination of hardware and software.

Referring to FIG. 3, the terminal includes a communication unit 310, a storage unit 320, a display 330, an input unit 340, and a controller 350.

The communication unit 310 performs a function for transmitting and receiving a signal via a wireless channel. For example, the communication unit 310 performs a conversion function between the baseband signal and the bitstream according to the physical layer standard of the system. The communication unit 310 may support wired communication or wireless communication. For example, when performing wireless communication, the communication unit 310 generates complex symbols by encoding and modulating a transmission bitstream for data transmission. In addition, when receiving data, the communication unit 310 restores the reception bitstream by demodulating and decoding the baseband signal. In addition, the communication unit 310 up-converts the baseband signal into a radio frequency (RF) band signal, transmits the signal through an antenna, and down-converts the RF band signal received through the antenna into a baseband signal. For example, the communication unit 310 may include a transmission filter, a reception filter, an amplifier, a mixer, an oscillator, a digital to analog convertor (DAC), an analog to digital convertor (ADC), and the like. The communication unit 310 transmits and receives a signal as described above. Accordingly, the communication unit 310 may be referred to as a transmitter, a receiver, or a transceiver. In addition, in the following description, transmission and reception performed via a wireless channel are used to mean that the processing as described above is performed by the communication unit 310.

The storage unit 320 stores data such as a basic program, an application program, and setting information for the operation of the terminal. The storage unit 320 provides the stored data at the request of the controller 350.

The display 330 outputs data and information to be recognized by the user. For example, the display 330 may configure and display a visually recognizable screen. However, according to various embodiments of the disclosure, the display 330 may be replaced with another device capable of outputting a form that can be recognized by other senses in addition to being visually recognized. To this end, the display 330 may include at least one hardware module for output. For example, the hardware module may include at least one of a speaker, a liquid crystal display (LCD), a light emitting diode (LED), a light emitting polymer display (LPD), an organic light emitting diode (OLED), an active matrix organic light emitting diode (AMOLED), and a flexible LED (FLED).

The input unit 340 performs functions for detecting an input of the user. The input unit 340 may transfer a command or data input from the user to the controller 350. To this end, the input unit 340 may include at least one hardware module for input. For example, the hardware module may include at least one of a sensor, a keyboard, a touch pad, and a button. For example, the input unit 340 may provide data about the touch input (e.g., tap, press, pinch, stretch, slide, swipe, rotate, etc.) of the user input through a touch pad to the controller 350. According to an embodiment, the display 330 and the input unit 340 may be implemented as one component. For example, the display 330 and the input unit 340 may be implemented in the form of a touch screen.

The controller 350 controls the overall operations of the terminal. For example, the controller 350 transmits and receives a signal through the communication unit 310. In addition, the controller 350 records data in the storage unit 320 and reads out. To this end, the controller 350 may include at least one processor or a microprocessor, or may be part of a processor. In addition, a part of the communication unit 310 and the controller 350 may be referred to as a communication processor (CP).

According to various embodiments, the controller 350 may transmit the position information of the subscriber, receive the recommendation information related to the communication of the subscriber device at the location indicated by the position information, and control to display the recommendation information. For example, the controller 350 may control the terminal to perform operations according to various embodiments of the disclosure.

Figure 4:
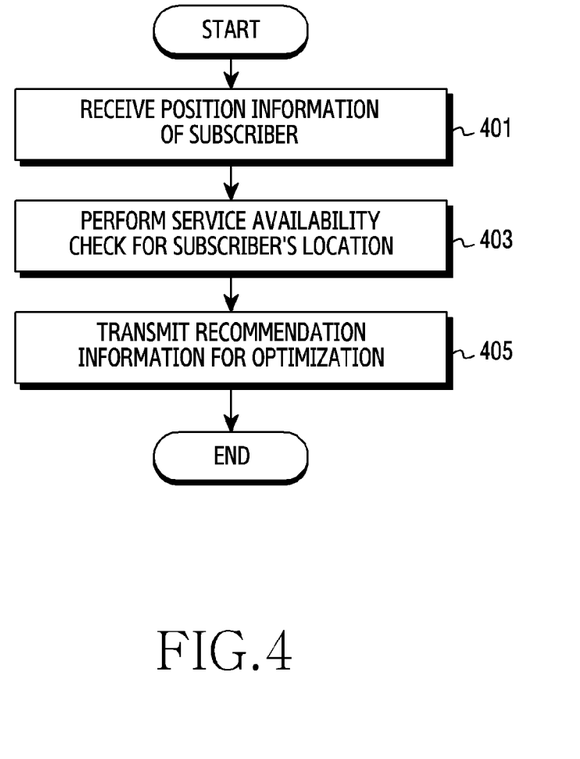
FIG. 4 illustrates a flowchart of a server in a wireless communication system according to various embodiments of the disclosure.

FIG. 4 illustrates a flowchart of a server in a wireless communication system according to various embodiments of the disclosure. FIG. 4 exemplifies an operation method of the server 110.

Referring to FIG. 4, the server receives subscriber's position information in operation 401. Here, the subscriber is used to mean a subscriber who is going to subscribe. For example, the server may receive the position information of the subscriber via the web page. In this case, the position information may be received from a device (e.g., the terminal 130) other than the subscriber's device (e.g., the terminal 120). The position information may include at least one of an address, latitude and longitude, a global positioning system (GPS) measurement value, and another type of location measurement related value. In addition, the position information may include information about the installation height of the subscriber's device. Furthermore, in addition to the position information, information on the environment in which the subscriber's device is installed (e.g., the material of the wall/ceiling, the structure of the building, the location/orientation of the window, etc.) may be received together.

In operation 403, the server performs a service availability identify on the subscriber's location. Specifically, the server may perform a simulation of the frequency environment for the site indicated by the position information, and determine whether the service is available, based on the simulation result. Here, the simulation may be performed by considering various items in consideration for the direction, reflection, absorption, transmission, etc. of the signal as well as the evaluation of the path loss. For example, the server may perform simulations according to a ray-tracing technique. In this case, the server may perform simulation at least one beam in a wireless channel between the base station and the subscriber's device using the terrain information (e.g., building, utility pole, light pole, layout information such as rooftop, information about obstacle such as tree). Also, the server may determine the service availability, based on at least one indicator related to the signal obtained by the simulation. For example, the server may determine the server availability by comparing the quality value and change rate of a signal with a threshold.

In operation 405, the server transmits recommendation information for optimization. The recommendation information relates to the communication of the subscriber's device at the corresponding site, and is for improving the communication quality. That is, the server may determine at least one condition capable of improving communication quality, based on the simulation result, and then transmit recommendation information indicating at least one condition. For example, the at least one condition may include at least one of installation position/direction of a device, the configuration of a device (e.g., the power configuration value), the installation position/direction of an antenna, the installation position/direction of assist equipment. Accordingly, the recommendation information may include at least one of information on the installation of the device, information on the installation of the antenna, information on the recommendation of the assist equipment, information for purchasing the assist equipment (e.g., link to the purchase site), and information on the installation of the assist equipment. For example, the assist equipment may be a passive device such as a reflector and an additional antenna for the reflection of the signal, or an electronic device such as a repeater for the relay of the signal.

Figure 5:
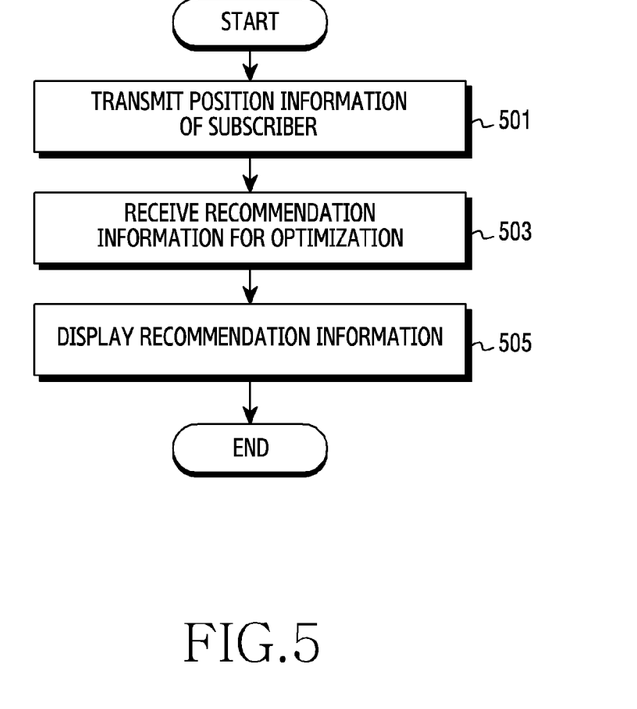
FIG. 5 illustrates a flowchart of a terminal in a wireless communication system according to various embodiments of the disclosure.

FIG. 5 illustrates a flowchart of a terminal in a wireless communication system according to various embodiments of the disclosure. FIG. 5 exemplifies an operation of the terminal 130.

Referring to FIG. 5, in operation 501, the terminal transmits position information of a subscriber. For example, the terminal may transmit position information input by the user or obtained via positioning. That is, the position information may be determined by an input to a user of the terminal, or may be determined without a user's manipulation as one of a series of procedures according to execution of an availability analysis function (e.g., analysis application execution). If the subscriber's device is a fixed device, the position information may indicate where the subscriber's device is to be installed. Alternatively, if the subscriber's device is a device having mobility, the position information may indicate where the subscriber is expected to be primarily located.

In operation 503, the terminal receives recommendation information for optimization. The recommendation information may inform at least one condition that may improve the communication quality, based on the simulation result performed by the server. For example, the recommendation information may include at least one of information on the installation of a device, information on the installation of an antenna, information on the recommendation of the assist equipment, information for purchasing the assist equipment (e.g., link to the purchase site), and information on the installation of the assist equipment. For example, the assist equipment may be a passive device such as a reflector and an additional antenna for the reflection of the signal, or an electronic device such as a repeater for the relay of the signal.

In operation 505, the terminal displays recommendation information. In other words, the terminal may display a graphic, an image, a text, etc. representing the recommendation information through a display (e.g., the display 330). In this case, the display screen of the recommendation information may be implemented in various forms. For example, the terminal may represent the inside/outside of the building in 2-dimension (2D)/3-dimension (3D) graphics and display the installation guide of the device or the assist equipment on the inside/outside of the building represented by the graphic. In other words, the display screen of the recommendation information may include a graphic representing the building and an installation indicator of a device or assist equipment displayed in the graphic. Alternatively, the terminal may display at least one of a guide phrase for explaining a site that satisfies a specific condition and an example of a site (e.g., beside a window, a roof, etc.) using a letter or an icon.

According to the embodiments described with reference to FIGS. 4 and 5, the service availability of the subscriber's location or the expected location is determined, and recommendation information for optimizing the service quality may be provided. Accordingly, the measures necessary to provide the service to the subscriber can be made during the installation of the device.

In addition to the embodiments described with reference to FIGS. 4 and 5, functions related to the determination of the additional installation of the base station for expanding the service availability and the evaluation of the level of service quality available to the subscriber may be further provided. More detailed operations of the server, including these functions, are described below with reference to FIG. 6.

Figure 6:
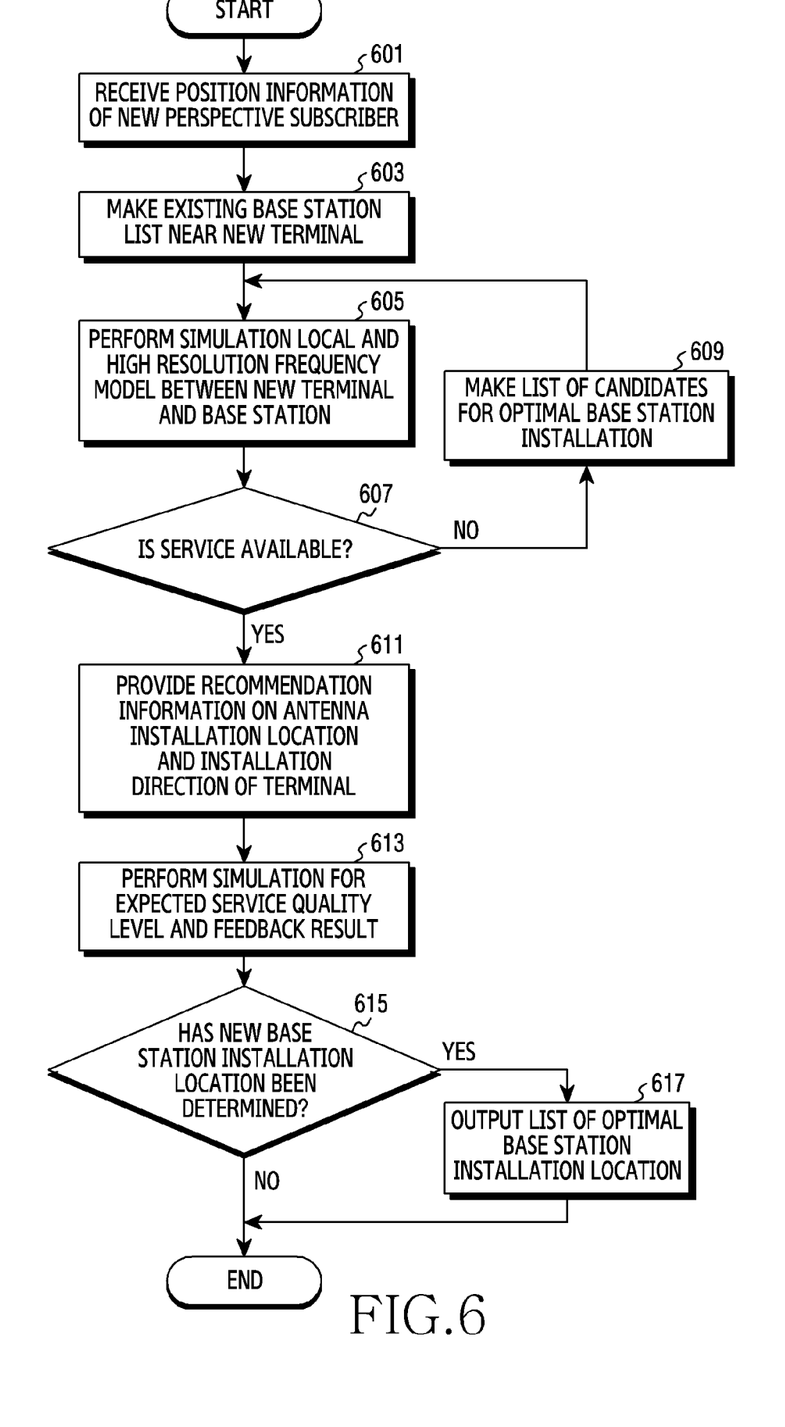
FIG. 6 illustrates a more detailed flowchart of a server in a wireless communication system according to various embodiments of the disclosure.

FIG. 6 illustrates a more detailed flowchart of a server in a wireless communication system according to various embodiments of the disclosure. FIG. 6 exemplifies an operation of the server 110.

Referring to FIG. 6, in operation 601, the server receives position information of a new prospective subscriber. The position information may include at least one of an address, latitude and longitude, GPS measurement values, and other types of location measurement related values. In addition, the position information may include information on the installation height of the device of the prospective subscriber. Furthermore, in addition to the position information, information about the environment in which the subscriber's device is installed may be received together.

In operation 603, the server makes a list of existing base stations near the new terminal, that is, the device of the new perspective subscriber. The server searches for at least one base station that is expected to be able to provide a service to a site indicated by the position information received in operation 601 using base station placement information. For example, the server may select at least one base station, based on the distance to the site, whether the line of sight (LOS) with the site, the presence and number of obstacles between the site and the base station.

In operation 605, the server performs local and high resolution frequency model simulation between the new terminal and base station list. For example, the server may perform simulations according to the ray-tracing technique. That is, the server performs a simulation considering physical changes such as reflections, transmissions, and absorptions of a signal transmitted from a base station according to radio channels and obstacles existing on the wireless channel between at least one base station and a new terminal included in the base station list. In this case, beamforming performed at the base station may be further considered. Accordingly, the server may obtain at least one indicator (e.g., multipath, loss, signal strength/quality, etc.) for the signal transmitted from the at least one base station included in the base station list and received at the new terminal.

In operation 607, the server determines whether the service is available. In other words, the server determines which one of the at least one base station included in the base station list satisfies the service provision requirement. Specifically, the server may determine whether the service is available by comparing at least one indicator for the signal for each base station obtained via simulation with a predefined threshold.

If the service is unavailable, in operation 609, the server makes an optimal base station installation site candidate list. That is, the server may determine to which location the base station is additionally installed if the server is available. To this end, the server may determine a candidate location for further installation of the base station, and then perform a simulation on the virtual base station at the candidate location. At this time, in order to determine candidate location, the server may refer to other service available locations and relative positions of a base station providing services to the service available locations. For example, the server may refer to information about another service available location having a geographical feature similar to the site indicated by the position information received in operation 601. The server then returns to operation 605.

If the service is available, in operation 611, the server provides the recommendation information on an antenna installation location and installation direction of the terminal. That is, the server generates and transmits recommendation information for optimizing communication quality. Additionally, the server may further provide at least one of the recommendation information for the configuration of the device and the recommendation information for the assist equipment.

In operation 613, the server performs a simulation on the expected service quality level, and then feeds back the simulation results. For example, the server may perform simulations according to the ray-tracing technique. According to another embodiment, the server may determine the service quality level using the simulation result performed in operation 605. According various embodiments of the disclosure, the quality of service level may include at least one of a maximum signal strength, a maximum data rate, a type of service that can be supported (e.g., whether a real-time streaming service can be supported), and a supportable transmission mode.

In operation 615, the server determines whether the new base station installation site has been determined. That is, the server determines whether operation 609 has been performed. If no new base station installation site has been determined, the server ends this procedure. On the other hand, if the new base station installation site has been determined, in operation 617, the server outputs a list of the optimal base station installation site. That is, the server may output a list of base station installation sites to recommend additional installation of the base station to the network operator or service provider.

According to the embodiment described with reference to FIG. 6, even if the service is not available, service availability can be secured via additional installation of a base station. In addition, by providing expected results for the level of quality of service, the user's predictability of services may be enhanced. The embodiment of FIG. 6 is described in terms of signaling of the server and the terminal as shown in FIG. 7.

Figure 7:
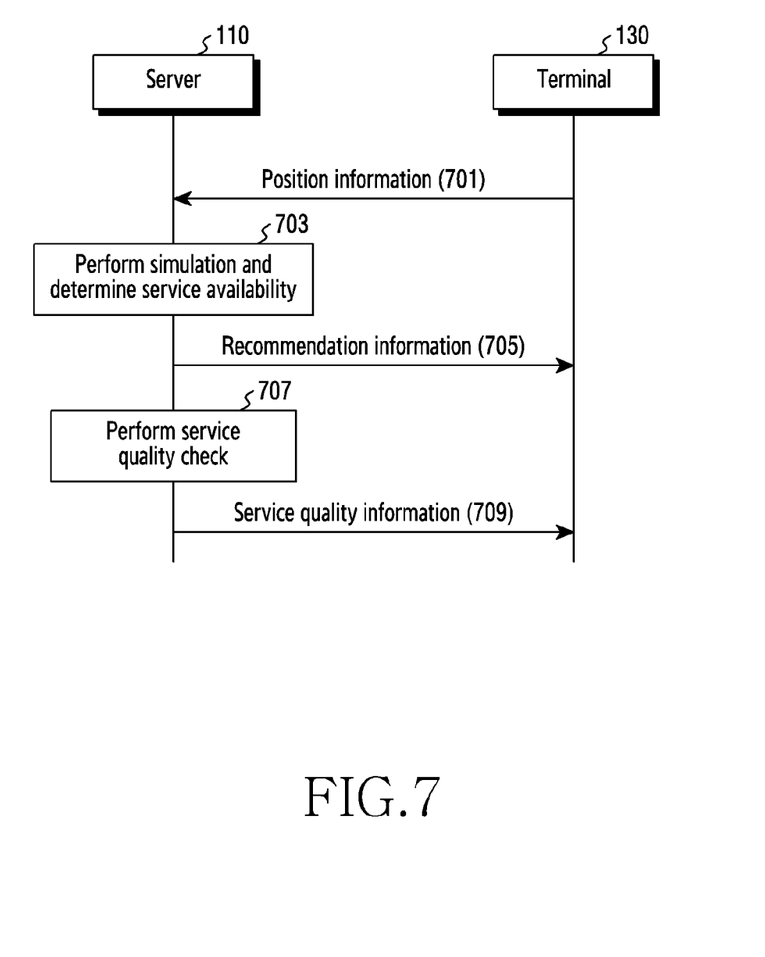
FIG. 7 illustrates a signal exchange between a server and a terminal in a wireless communication system according to various embodiments of the disclosure.

FIG. 7 illustrates a signal exchange between a server and a terminal in a wireless communication system according to various embodiments of the disclosure. FIG. 7 exemplifies signal exchange between the server 110 and the terminal 130.

Referring to FIG. 7, in operation 701, the terminal 130 transmits position information. That is, the terminal 130 may execute an application for subscriber management according to a user's operation, access a web page provided by the server 110, and then transmit position information. The position information may be packetized at a specific layer (e.g., an application layer) and transmitted via a corresponding protocol (e.g., hypertext transfer protocol (HTTP)). Accordingly, in operation 703, the server 110 performs a simulation and determines service availability according to the simulation result. Although not shown in FIG. 7, when the service is not available, the server may determine an additional installation site of the base station.

In operation 705, the server 110 transmits recommendation information. The recommendation information may include information on the installation/configuration of the subscriber's device (e.g., the terminal 120) and information on the recommendation/installation of assist equipment. The recommendation information may include text or graphic image data directly describing the content of the recommendation, or may include at least one indicator representing a predefined text or graphic.

Subsequently, in operation 707, the server 110 performs a service quality check. To this end, the server 110 may perform an additional simulation or, may use the simulation result performed in operation 703. In operation 709, the server 110 transmits service quality information. The service quality information may indicate at least one indicator related to at least one of quality of service (QoS), signal strength, transmission rate, and communication technique. The service quality information may be utilized by the prospective subscriber to determine whether to subscribe or to accept the recommendation.

According to various embodiments described above, based on the information on the location where the particular subscriber is to install the terminal, the service availability, the service quality level, etc. for the terminal can be evaluated. The above embodiments have been described as being performed by the subscriber in the process of installing the terminal. However, according to various embodiments, the above-described evaluation operations such as service availability, service quality level, etc. can be utilized for various purposes. For example, the above-described operations may be used for statistical determination of serviceable area, data acquisition of business feasibility, and the like as shown in FIGS. 8A and 8B.

Figure 8A:
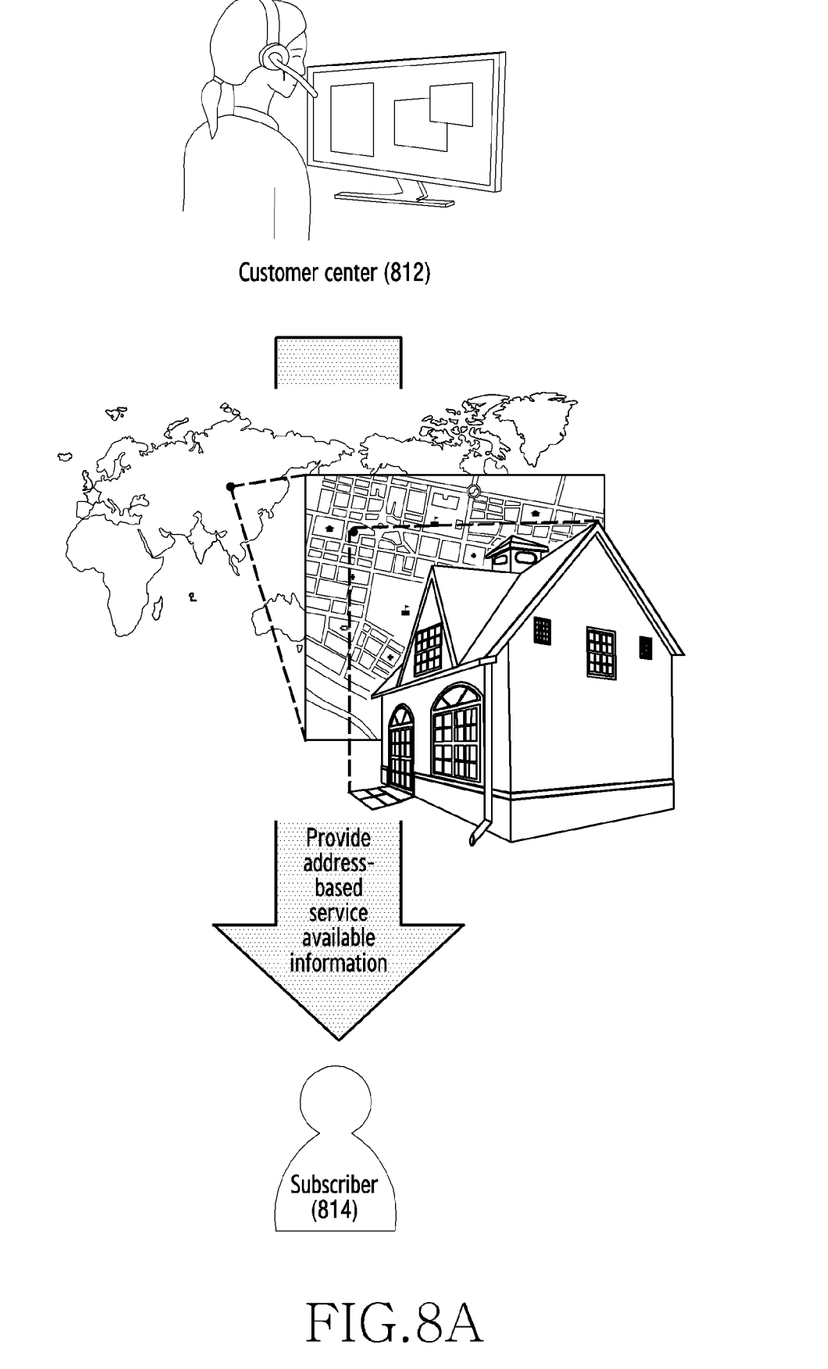
FIGS. 8A and 8B illustrate utilization examples of a service availability analysis technique according to various embodiments of the disclosure.
Figure 8B:
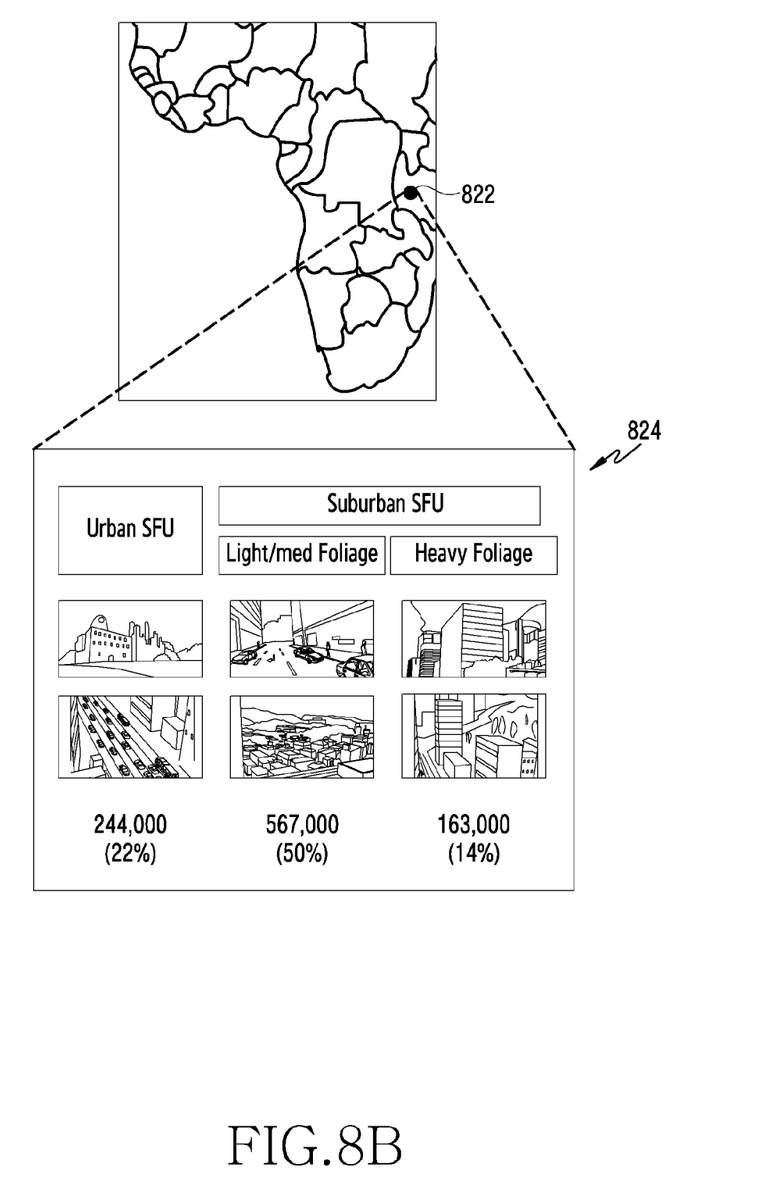

FIGS. 8A and 8B illustrate the utilization examples of a service availability analysis technique according to various embodiments of the disclosure.

Referring to FIG. 8A, a customer center 812 may determine accurate service availability, based on the subscriber's position information (e.g., address). In addition, the customer center 812 may provide service availability information to the subscriber 814. In this case, the service availability may be determined in advance at the subscriber attraction stage, and action may be taken if the service is not available.

Referring to FIG. 8B, service availability related information 824 for a particular region 822 may be collected. Accordingly, the number of households that can be serviced per base station may be statistically calculated for each region. Furthermore, these statistical data may be used to determine business viability.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An operation method of a server in a wireless communication system, the method comprising:
   receiving position information and environment information for indicating a location of a terminal;
   identifying a base station within a threshold distance from the location;
   identifying a channel quality between the base station and the terminal by performing a model simulation based on terrain information between the base station and the terminal;
   identifying service availability of the location, based on the channel quality; and
   transmitting recommendation information related to communication of the terminal, based on the service availability,
   wherein the position information comprises a height of the terminal,
   wherein the environment information comprises information for an environment related to an installation of the terminal,
   wherein the environment related to the installation of the terminal comprises at least one of a material of a wall, a material of a ceiling, a location of a window, or an orientation of a window,
   wherein the terrain information comprises layout information and obstacle information, the layout information including information of at least one of a utility pole, a light pole, or a rooftop, and
   wherein the recommendation information comprises at least one of information on assist equipment for the terminal, information for purchasing the assist equipment, or information on installation of the assist equipment.

2. The method of claim 1, further comprising, if a service for the location is unavailable, identifying a candidate location for further installation of another base station to provide the service for the location.

3. The method of claim 2, further comprising outputting information on the candidate location.

4. The method of claim 1, further comprising:
   identifying a quality level of a service provided for the terminal; and
   transmitting information informing the quality level of the service.

5. The method of claim 1, wherein the channel quality comprises at least one multipath, loss, signal strength, or signal quality.

6. The method of claim 1, wherein the assist equipment comprises a reflector for reflection of a signal.

7. The method of claim 1, wherein the assist equipment comprises an additional antenna.

8. The method of claim 1, wherein the assist equipment comprises a repeater for relaying of a signal.

9. An operation method of a terminal in a wireless communication system, the method comprising:
- transmitting, to a server, position information and environment information for indicating a location;
- receiving, from the server, recommendation information related to communication of the terminal; and
- displaying the recommendation information,
- wherein the recommendation information is identified, based on service availability,
- wherein the service availability is identified, based on a channel quality between a base station and the terminal,
- wherein the base station is within a threshold distance from the location,
- wherein the channel quality is identified based on a model simulation using terrain information, wherein the model simulation is performed by a server model simulation,
- wherein the position information comprises a height of the terminal,
- wherein the environment information comprises information for an environment related to an installation of the terminal,
- wherein the environment related to the installation of the terminal comprises at least one of a material of a wall, a material of a ceiling, a location of a window, or an orientation of a window,
- wherein the terrain information comprises layout information and obstacle information, the layout information including information of at least one of a utility pole, a light pole, or a rooftop, and
- wherein the recommendation information comprises at least one of information on the installation of the terminal, information on installation of an antenna connected to the terminal, information on assist equipment for the terminal, information for purchasing the assist equipment, and information on installation of the assist equipment.

10. The method of claim 9, wherein the recommendation information is displayed via a graphic representing a building corresponding to the location and a screen including an installation indicator of the terminal or the assist equipment for the terminal in the graphic.

11. The method of claim 9, further comprising receiving information informing a quality level of a service provided to the terminal.

12. A server device in a wireless communication system, the device comprising:
- a transceiver; and
- a controller connected to the transceiver,
- wherein the controller is configured to:
  - receive position information and environment information for indicating a location of a terminal;
  - identify a base station within a threshold distance from the location;
  - identify a channel quality between the base station and the terminal by performing a model simulation based on terrain information between the base station and the terminal;
  - identify service availability of the location, based on the channel quality; and
  - transmit recommendation information related to communication of the terminal, based on the service availability,
- wherein the position information comprises a height of the terminal,
- wherein the environment information comprises information for an environment related to an installation of the terminal,
- wherein the environment related to the installation of the terminal comprises at least one of a material of a wall, a material of a ceiling, a location of a window, or an orientation of a window,
- wherein the terrain information comprises layout information and obstacle information, the layout information including information of at least one of a utility pole, a light pole, or a rooftop, and
- wherein the recommendation information comprises at least one of information on the installation of the terminal, information on installation of an antenna connected to the terminal, information on assist equipment for the terminal, information for purchasing the assist equipment, and information on installation of the assist equipment.

13. The device of claim 12, wherein the controller, if a service for the location is unavailable, is configured to identify a candidate location for further installation of another base station to provide the service for the location.

14. The device of claim 13, wherein the controller is configured to output information on the candidate location.

15. The device of claim 12, wherein the controller is configured to identify a quality level of a service provided to the terminal and transmit information indicating the quality level of the service.

* * * * *